United States Patent
Wang et al.

(10) Patent No.: US 11,822,614 B2
(45) Date of Patent: *Nov. 21, 2023

(54) SYSTEM AND METHOD FOR IDENTIFYING AND SCORING IN-PAGE BEHAVIOR

(71) Applicant: Content Square SAS, Paris (FR)

(72) Inventors: Hui Wang, Paris (FR); Vincent Colombet, Paris (FR)

(73) Assignee: Content Square SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,305

(22) Filed: Jul. 8, 2022

(65) Prior Publication Data

US 2022/0382826 A1 Dec. 1, 2022

Related U.S. Application Data

(63) Continuation of application No. 16/934,473, filed on Jul. 21, 2020, now Pat. No. 11,416,574.

(51) Int. Cl.
| | | |
|---|---|---|
| *G06F 16/958* | (2019.01) | |
| *G06F 16/957* | (2019.01) | |
| *G06F 11/34* | (2006.01) | |
| *G06Q 30/0601* | (2023.01) | |
| *G06F 40/14* | (2020.01) | |
| *G06F 40/143* | (2020.01) | |

(52) U.S. Cl.
CPC ...... *G06F 16/9577* (2019.01); *G06F 11/3438* (2013.01); *G06F 16/958* (2019.01); *G06F 40/14* (2020.01); *G06F 40/143* (2020.01); *G06Q 30/0641* (2013.01)

(58) Field of Classification Search
CPC .... G06F 16/9577; G06F 40/143; G06F 40/14; G06F 16/958; G06F 11/3438; G06Q 30/0641

See application file for complete search history.

(56) References Cited

U.S. PATENT DOCUMENTS

| | | | |
|---|---|---|---|
| 7,591,000 B2 * | 9/2009 | Griffin | H04L 63/10 726/1 |
| 11,416,574 B2 | 8/2022 | Wang et al. | |
| 2005/0097008 A1 * | 5/2005 | Ehring | G06F 40/103 715/205 |
| 2007/0271511 A1 * | 11/2007 | Khopkar | G06F 40/106 707/E17.116 |

(Continued)

OTHER PUBLICATIONS

"U.S. Appl. No. 16/934,473, Examiner Interview Summary dated Mar. 31, 22", 2 pgs.
"U.S. Appl. No. 16/934,473, Final Office Action dated Aug. 9, 21", 13 pgs.
"U.S. Appl. No. 16/934,473, Non Final Office Action dated Mar. 10, 2021", 11 pgs.

(Continued)

*Primary Examiner* — Keith D Bloomquist
(74) *Attorney, Agent, or Firm* — Schwegman Lundberg & Woessner, P.A.

(57) ABSTRACT

A system and method for analyzing in-page behavior. A method includes recording sessions of users browsing a website, wherein a session is time-ordered collection of a user's interactions with one or more webpages belonging to the website; analyzing recorded sessions to generate session insights, wherein the session insights are based in part on user experience factors, wherein each user experience factor relates to behavior of a user within each webpage visited during a session; and reporting the generated experience insights.

20 Claims, 7 Drawing Sheets

(56) References Cited

U.S. PATENT DOCUMENTS

| | | | |
|---|---|---|---|
| 2008/0005793 A1* | 1/2008 | Wenig | G06F 11/3495 726/22 |
| 2014/0026066 A1* | 1/2014 | Fishman | G06Q 30/0277 715/745 |
| 2014/0189714 A1* | 7/2014 | Lawbaugh | G06F 11/3644 719/313 |
| 2015/0205887 A1* | 7/2015 | Freund | G06F 16/9535 707/722 |
| 2018/0039530 A1 | 2/2018 | Ciabarra, Jr. et al. | |
| 2019/0124167 A1* | 4/2019 | Reshef | H04L 41/14 |
| 2019/0146616 A1* | 5/2019 | White | G06F 11/3438 715/704 |
| 2022/0027430 A1 | 1/2022 | Wang et al. | |

OTHER PUBLICATIONS

"U.S. Appl. No. 16/934,473, Non Final Office Action dated Dec. 10, 2021", 15 pgs.

"U.S. Appl. No. 16/934,473, Notice of Allowance dated Jul. 8, 2022", 6 pgs.

"U.S. Appl. No. 16/934,473, Response filed Mar. 18, 22 to Non Final Office Action dated Dec. 10, 2021", 17 pgs.

"U.S. Appl. No. 16/934,473, Response filed Jul. 8, 21 to Non Final Office Action dated Mar. 10, 2021", 11 pgs.

"U.S. Appl. No. 16/934,473, Response filed Nov. 4, 21 to Final Office Action dated Aug. 9, 2021", 16 pgs.

U.S. Appl. No. 16/934,473, U.S. Pat. No. 11,416,574, filed Jul. 21, 2020, System and Method for Identifying and Scoring in Page Behavior.

* cited by examiner

Fig. 6

SYSTEM AND METHOD FOR IDENTIFYING AND SCORING IN-PAGE BEHAVIOR

CLAIM OF PRIORITY

This Application is a continuation of and claims the benefit of priority to U.S. application Ser. No. 16/934,473, filed Jul. 21, 2020, which is hereby incorporated by reference in its entirety.

TECHNICAL FIELD

The present disclosure relates generally to tracking visitors of websites and, more specifically, to a system and method of tracking and analyzing in-page behavior.

BACKGROUND

In the modern internet landscape, browser-based content plays an important role in providing reliable, accessible platforms for users to engage with social, shopping, entertainment, and other types of content. Content providers, who may host or maintain sites related to their products or services, may use web technology to provide site visitors with intuitive and seamless user experiences (UXs). As UX technology becomes increasingly refined, content providers may race to improve their sites to avoid losing potential visitors to other, competing sites. UX improvement may include certain objective goals, such as minimization of page loading times, but may also require analysis of subjective user experiences to determine which aspects of a website must be adjusted to provide an optimal user experience. Without data-driven UX optimization solutions, improving a website's UX may be costly, time-consuming, and difficult to standardize.

Currently, user experience input collection is a painstaking process. Web developers may manually review websites using a variety of devices and browsers to ensure that users can enjoy the site experience regardless of the way in which the users connect with the site, which may require a great time outlay on the part of the developer. Further, developers may collect user feedback by reviewing submissions from site visitors, a method which may lead only to identification of issues spotted by those users who are motivated to submit their feedback. User experience optimization based on these methods may also fail to show a developer the issues a new user faces when connecting with the site. As the same developer who designed a website may be tasked with subsequent optimization, the developer's understanding of the site may be greater than that of a novice or average user, possibly leading the developer to overlook UX issues which would frustrate the website's target audience.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for analyzing in-page behavior. The method comprises: recording sessions of users browsing a website, wherein a session is time-ordered collection of a user's interactions with one or more webpages belonging to the website; analyzing recorded sessions to generate session insights, wherein the session insights are based in part on user experience factors, wherein each user experience factor relates to behavior of a user within each webpage visited during a session; and reporting the generated experience insights.

Certain embodiments disclosed herein also include a non-transitory computer readable medium having stored thereon instructions for causing a processing circuitry to execute a process, the process comprising: recording sessions of users browsing a website, wherein a session is time-ordered collection of a user's interactions with one or more webpages belonging to the website; analyzing recorded sessions to generate session insights, wherein the session insights are based in part on user experience factors, wherein each user experience factor relates to behavior of a user within each webpage visited during a session; and reporting the generated experience insights.

In addition, certain embodiments disclosed herein include a system for analyzing in-page behavior. The system comprises: a processing circuitry; and a memory, the memory containing instructions that, when executed by the processing circuitry, configure the system to: record sessions of users browsing a website, wherein a session is time-ordered collection of a user's interactions with one or more webpages belonging to the website; analyze recorded sessions to generate session insights, wherein the session insights are based in part on user experience factors, wherein each user experience factor relates to behavior of a user within each webpage visited during a session; and report the generated experience insights.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an insight report, according to an embodiment.

DETAILED DESCRIPTION

Figure 1:
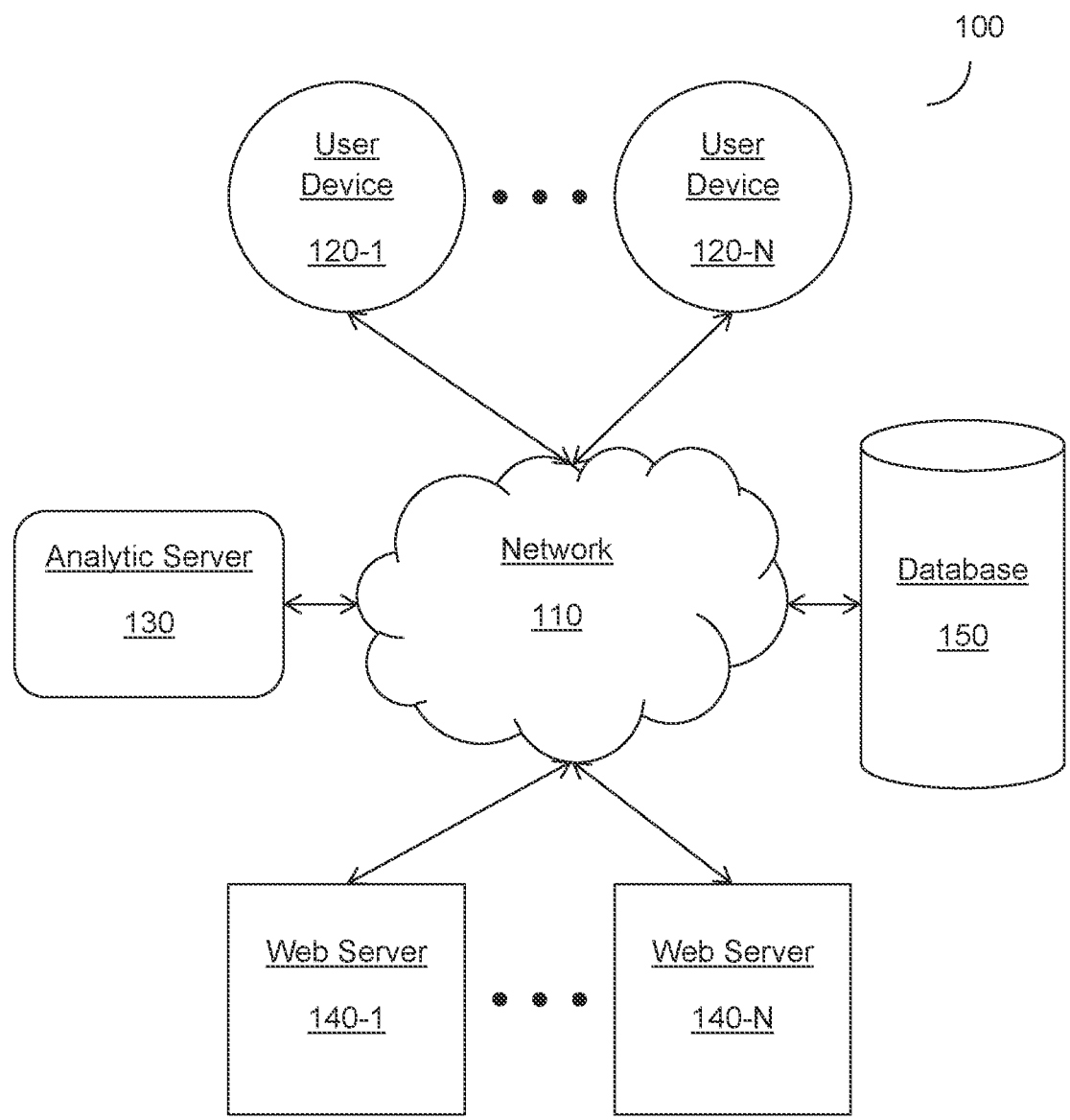
FIG. 1 is a network diagram depicting a network system disclosing the embodiments for identifying and scoring in-page behavior and various anomalies and negative user experiences therein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for identifying and scoring in-page behavior. The disclosed embodiments further include identifying anomalies and scoring the same. Websites may include a variety of content features and elements, for which a developer may intend certain user interactions targeted to a specific goal, such as completing a purchase. As issues in a website's layout or content features may produce unexpected results, causing users to have a negative user experience and reducing the percentage of users who complete their web session in the manner desired by the developer, developers may wish to better understand the sources of negative user experiences within a website, allowing for optimization to increase goal yield. The disclosed system and methods address the need for such understandings and optimizations, providing insight into user in-page behavior, causes of negative user experiences, and the effects of these causes on the developer's web experience goals.

FIG. 1 is an example network diagram depicting a network system 100 disclosing the embodiments for identifying and scoring in-page behavior and various anomalies and negative user experiences therein. The system 100 includes one or more user devices, 120-1 through 120-N (hereinafter, "user device" 120 or "user devices" 120), an analytic server 130, one or more web servers, 140-1 through 140-N(hereinafter "web server" 140 or "web servers" 140), and a database 150. Further, in the system 100, the various components listed are interconnected via a network 110.

The network 110 provides interconnectivity between the various components of the system.

The network 110 may be, but is not limited to, a wireless, cellular or wired network, a local area network (LAN), a wide area network (WAN), a metro area network (MAN), the Internet, the worldwide web (WWW), similar networks, and any combination thereof. The network may be a full-physical network, including exclusively physical hardware, a fully-virtual network, including only simulated or otherwise virtualized components, or a hybrid physical-virtual network, including both physical and virtualized components. Further, the network 110 may be configured to encrypt data, both at rest and in motion, and to transmit encrypted, unencrypted, or partially-encrypted data. The network 110 may be configured to connect to the various components of the system 100 via wireless means such as, as examples and without limitation, Bluetooth (tm), long-term evolution (LTE), Wi-Fi, other, like, wireless means, and any combination thereof, via wired means such as, as examples and without limitation, ethernet, universal serial bus (USB), other, like, wired means, and any combination thereof. Further, the network 110 may be configured to connect with the various components of the system 100 via any combination of wired and wireless means.

The user devices 120 may be devices allowing a user to interact with the system 100 for purposes including, as examples and without limitation, providing sessions to the system 100 for analysis, receiving returns or outputs from the system 100, configuring system 100 parameters, other, like, purposes, and any combination thereof. Further, a user device 120 may be configured to receive returns or outputs from the web servers 140 to view webpages or other content developed by any of the web servers 140. A user device 120 typically includes a web browser (now shown) or any application (virtual, web, mobile, and the like) which allows a user to view, download, interact with, and engage with content provided by the web servers 140, the analytic server 130, or both. Examples of user devices 120 may be smartphones, personal computers, business systems, dedicated kiosks, tablet computers, and other, like, devices.

In an embodiment, a user device 120 may be operated by an administrator of one or more websites hosted by the web server or servers 140. Through the user device 120, reports generated by the analytic server 130 may be viewed. The user device 120 may be further configured to allow for configuration of one or more components of the system 100, issuing or executing instructions, manipulating data, and the like.

The analytic server 130, depicted in detail with respect to FIG. 7, below, is a system configured to execute instructions, organize information, and otherwise process data. The analytic server 130 may be configured to execute the methods described hereinbelow, other, like, methods, and any combination thereof. As described with respect to FIG. 7, below, the analytic server 130 may include various processing, memory, networking, and other components allowing the analytic server 130 to execute instructions and provide data processing. The analytic server 130 may be implemented as physical hardware, as software virtualizing physical hardware, or as a combination of physical and virtualized components. The analytic server 130 may be connected to the network 110 via those means described with respect to the network 110, above. The various processes performed by the analytic server 130 are described in greater detail hereinbelow.

According to the disclosed embodiments, the analytic server 130 is configured to execute instructions for identifying and scoring in-page behavior and various anomalies, including within a session. A session is a collection of a visitor's entire combined interactions with a webpage or website, where the combined interactions are not interrupted by significant gaps of time or visits to other sites or pages. An example session may be a user's visit to a shopping website, from the user's arrival on the site's home page through the user's completion of a product order.

The web servers 140 may be one or more web sources of data other than the inputs received from the user devices 120. The web servers 140 may include data relating to websites, data relating to webpages, other, like, data, and any combination thereof. Data from the web servers 140 may be stored in the database 150 and may be processed by the analytic server 130. Web servers 140 may be local web sources, remote web sources, or any combination thereof. Examples of web servers 140 include, without limitation, repositories of webpage information, repositories of webpage element or zone classifications, "live" webpages, other, like, sources, and any combination thereof. Web servers 140 may be connected with the network 110 via the means described hereinabove.

The database 150 is a data store configured to archive data permanently or semi-permanently. The database 150 may be configured to store information received from one or more web servers 140, user devices 120, and other, like, components, as well as to store data relevant to the operation of the analytic server 130 and any outputs therefrom. The database 150 may be a local system, a remote system, or a hybrid remote-local system. Further, the database 150 may be configured as a full-physical system, including exclusively physical components, as a virtualized system, including virtualized components, or as a hybrid physical-virtual system. Examples of devices which may be configured as a database 150 in the system 100 include, without limitation, local database hardware, cloud storage systems, remote storage servers, other, like, devices, and any combination thereof.

According to an embodiment, the database 150 may be configured to store or otherwise archive data relating to detection, identification, and analysis of webpage sessions including, without limitation, webpages, user interactions, user sessions, other, like, data, and any combination thereof. Further, the database 150 may be configured to transfer, to and from the analytic server 130, data necessary for the execution of the methods described hereinbelow, and may store or otherwise archive analytic server 130 inputs, analytic server 130 outputs, or both.

Figure 2:
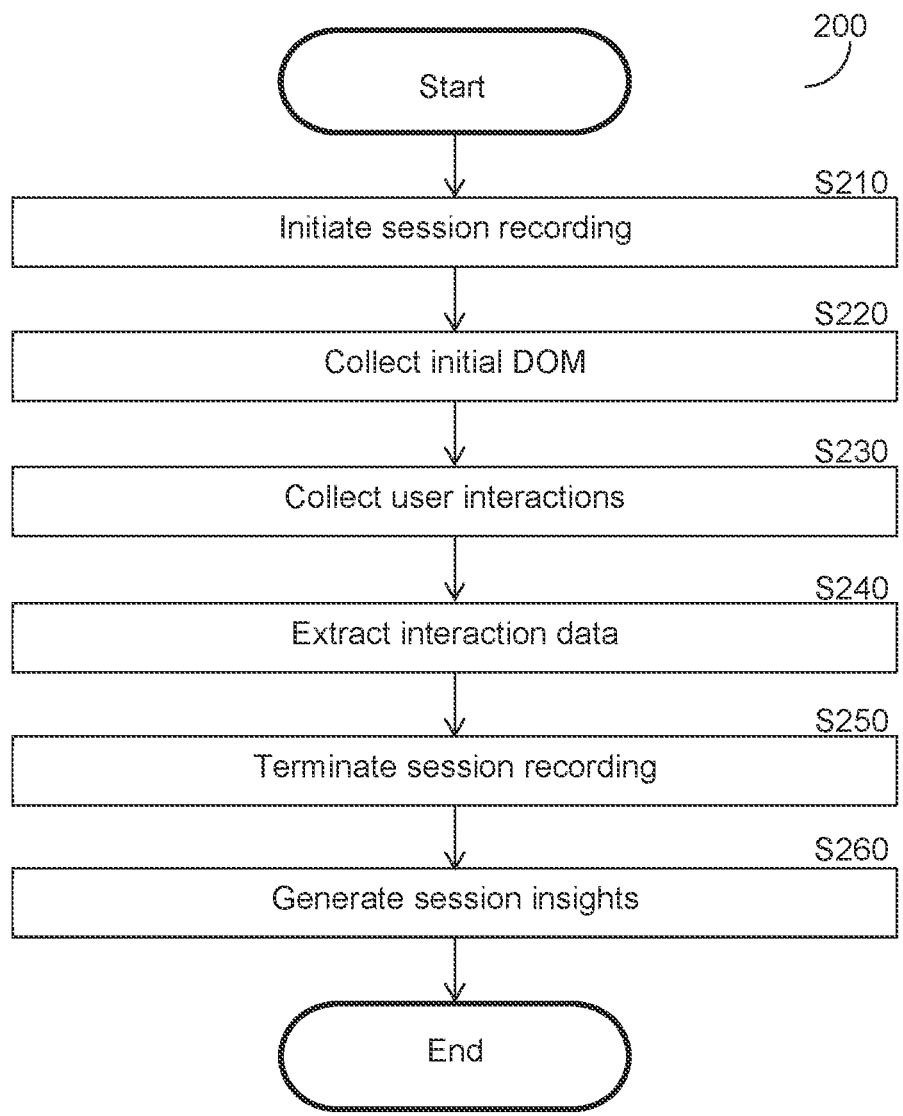
FIG. 2 is a flowchart describing a method for identifying user experience insights on a per-session basis, according to an embodiment.

FIG. 2 is an example flowchart 200 describing a method for identifying user experience insights on a per-session basis, according to an embodiment.

At S210, the session recording is initiated. A session is a time-ordered collection of a user's interaction with one or more webpages belonging to the same domain or website. The session starts when a user navigates to the website and ends when the user navigates out of the website. As an example, a session may include all of a user's activities across a shopping website, including activities on product pages, cart pages, and checkout pages. A session recording may be initiated when a user connects with a webpage host, such as the web servers, 140-1 through 140-N, of FIG. 1, above. A session recording may be initiated based on a user's connection with a webpage host through one or more user devices, including the user devices, 120-1 through 120-N, of FIG. 1, above.

A session recording is a collection of events occurring during the course of a session. A session recording may include events such as, as examples and without limitation, clicking on a button or element, entering text into a field, hovering over an image, scrolling through a page, other, like, events, and any combination thereof. A session recording may be structured as, as examples and without limitation, a video clip, a click-for-click navigation replay of a version of a webpage constructed for session recording, a list or table of event sequences and times, other, like, structures, and any combination thereof.

At S220, an initial document object model (DOM) is collected. A DOM is a "node and link" representation of the contents of a webpage, representing the elements of the webpage as "nodes" and the relationships between the elements as "links." The DOM provides for a representation of the webpage in a format other than that displayed in a user's web browser, indicating the contents and structure of the webpage without requiring review of the page's underlying HTML code. An example DOM tree, and a description thereof, is provided with respect to FIG. 5, below. The DOM may be applicable to the detection of session behaviors and negative user experiences by providing a low-to-no-code representation of the features of a page, where a user may engage with such features during a session, allowing for low-to-no-code analysis and visualization of the contents and structure of the webpage.

At S230, user interactions are collected. User interactions are events arising during a session when a user engages with website content. Examples of user interactions may include scrolling down a page, clicking a button or element, typing in a field, and other, like, interactions. User interactions are based on the targets of the various interactions, such as hyperlinks, data entry fields, and the like. As a first example, an "add to cart" button on a shopping website may allow the user to add an item to a digital shopping cart by updating the appropriate cart on the webpage host's platform. In the same first example, a user interaction may be recorded for each instance of a user clicking the "add to cart" button by counting the number of "add to cart" requests received from the given user, in that session, by the web host. Similarly, in a second example, a webpage host platform may be configured to update the value of a "first name" variable when a user enters text in a field in the webpage and clicks a "submit" button. In the same second example, the user's entry of text and clicking of the "submit" button may be recorded as a user interaction.

At S240, interaction data is extracted. Interaction data may be data describing the particular button, field, or other webpage element with which the user interacts, the values entered by the user during the interactions, the timing of the various interactions, the pattern or order of the various interactions, other, like, data, and any combination thereof. Interaction data is extracted by an analytic server, such as the analytic server, 130, of FIG. 1, above, from the interactions collected at S230. Extracted interaction data may be stored for subsequent analysis in local memory of an analytic server, in a database or other data repository, such as the database, 150, of FIG. 1, above, or both. Interaction data may be extracted at the time each interaction is collected, at regular time intervals, such as once an hour, at the occurrence of predefined trigger events, such as the completion of a sale or the end of a session, and in other cases as may be defined.

At S250, the session recording is terminated. The session recording may be terminated by a user's navigation to another webpage not included in the group or domain described at S210, by completion of a sale or other predefined event, or by other, like, events.

At S260, session insights are generated. Session insights are high-level data analyses generated based on a set of rules and directed to the identification of factors negatively impacting the user experience. Rules are various sequences of conditions applied to the interaction data extracted at S240. Rules may be directed to the detection of various factors negatively impacting a webpage user experience in the session and may be applied at a zone level, targeting only specific webpage zones or elements, at a page level, at a site level, or at other, like, levels of specificity. In an embodiment, S260 includes scoring the generated insights or in-page behavior of the users based on the analysis. The scoring is discussed in more detail below.

User experience factors are predefined interactions which indicate a user's difficulty or ease in operating or navigating a webpage or site. The factors may be indicative of a negative or positive interaction of a user with a website. In an example, the website may be an e-commerce website, and user experience factors may include data reflecting or describing one or more events which distract the user or otherwise hinder the user from reaching one or more predefined objectives or goals. User experience factors may include, without limitation, multiple-field and multiple-button interactions, which may be identified where a user clicks a given field or button more than a predefined number of times, and rage clicks, which may be identified where a user clicks a given element more than a predefined number of times in a period shorter than a predefined time threshold. In addition, user experience factors may include, without limitation, loading times, which may be identified where a page takes longer than a predetermined time threshold to load, "disappointment clicks," which may be identified where a user's click on a first page loads a second page, and where the user returns to the first page in a time below a predetermined time threshold, and multiple page visits, which may be identified where a user returns to the same page multiple times during a session. Further, user experience factors may include additional factors like those described above, as well as any combination of those factors described above and the various, like, factors.

Insights may be generated where the session interaction data collected at S230 includes one or more interactions matching user experience pattern rules, such as those described above. Insights may be scored based on user experience factor severity. In an embodiment, insights scored based on user experience factor severity may be rated as "low severity," "medium severity," or "high severity." User experience factor severity ratings may be determined based on factors including, without limitation, those interactions included in the determination of the identification of user experience factors, above, as well as various predetermined or otherwise specified thresholds. In an example, a "rage click" user experience factor, identified by rapid, repeated clicks in a short time, may be rated as "low severity" where three sequential clicks are recorded in under two seconds, as "medium severity" where four sequential clicks are recorded in under two seconds, or as "high severity" where five or more sequential clicks are recorded in under two seconds.

The insights generated at S260 may be filtered according to their respective traffic impact values. Filtering insights according to traffic impact values may provide for greater organization in insight reporting and may allow for elimination of insignificant or outlier insights. As a first example, a "rage click" filter may be configured such that insights including reports of "rage clicks" for less than one percent of visitors will be filtered out. As a second example, a high loading time filter may be configured such that insights including reports of high loading times for less than five percent of visitors will be filtered out. As a third example, a multiple page revisit filter may be configured such that insights including reports of multiple page revisits for less than ten percent of visitors will be filtered out.

Figure 3:
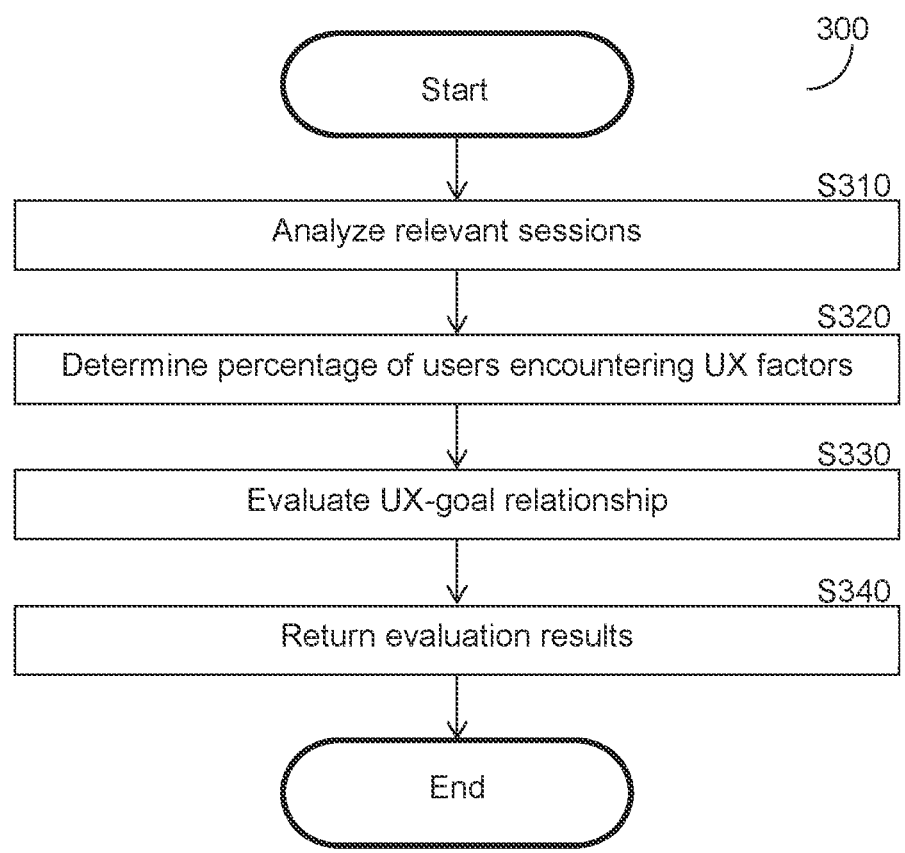
FIG. 3 is a flowchart describing a method for automatically detecting user experience insights, according to an embodiment.

FIG. 3 is an example flowchart 300 describing a method for automatically detecting user experience insights, according to an embodiment. The method may be performed as described with respect to S260 of FIG. 2.

A goal is a specified objective predefined by a client, administrator, or other user. A goal may be related to a specific action within a website and may include one or more thresholds defining whether the goal is met. Further, a goal may be a session-specific objective. As an example, a goal for a shopping website may be to collect, or to encourage a user to input, a click on a "cart checkout" button, or another, like, goal. The method described with respect to the flowchart 300 may be executed by an analytic server, such as the analytic server, 130, of FIG. 1, above.

At S310, a set or subset of relevant sessions is identified. Sessions may be analyzed to identify as relevant sessions those sessions including one or more pages which include goal-related content. Further, sessions may be analyzed to identify as relevant sessions those sessions occurring within various time periods, or under other, like, conditions, which include the same goal-related content. Sessions may be analyzed by methods similar or identical to those described with respect to FIG. 2, above.

Session analysis at S310 may further include the identification of relevant sessions including the achievement of one or more goals, as well as the determination of the total number of sessions including the achievement of one or more goals, as well as the associated factor of the total number of relevant sessions. Whether a session includes the achievement of one or more goals may be determined based on session behavior, as may be collected and analyzed in a manner similar or identical to that described with respect to FIG. 2, above. As an example, a session including the achievement of a "newsletter subscription" goal may be recorded where the session includes a visitor's entry of a string, formatted as an email address, into a "newsletter subscription" field, followed by a "subscribe" button click.

At S320, the percentage of users encountering user experience factors in the set of identified sessions is determined. The percentage of users encountering user experience factors may be determined based on the total number of relevant sessions identified at S310, and the number of those identified sessions which include one or more user behaviors indicating a negative user experience. Whether a given session includes one or more user behaviors indicating negative user experiences may be determined by methods similar or identical to those described with respect to FIG. 2, above, and, particularly, step S260 thereof.

Further, user experience detection at S320 may include determining the percentage of users reaching one or more predefined goals. Predefined goals may be established before or during a session, such as by an administrator, operator, or other user, and may relate to one or more site objectives, as described hereinabove. The percentage of users reaching one or more predetermined goals may be determined according to methods including, as an example and without limitation, collecting all sessions including a goal-completion event, subtracting those sessions which include duplicate users, as may be detected based on session data including duplicate identifiers such as user internet protocol (IP) addresses, user IDs, and the like, and dividing the remaining number of goal-completion sessions by the total number of non-duplicate sessions, including those non-duplicate sessions which do not include goal completion, thereby allowing for the determination of the percentage of users reaching the predefined goal or goals. Further, the percentage of users reaching a goal may be determined by other methods like that described hereinabove, as well as any combination thereof.

At S330, user experience-goal relationships are determined or otherwise evaluated. User experience-goal relationships describe the impact of one or more negative user experience factors on goal achievement. User experience-goal relationships may be predefined and may include relationships such as, as examples and without limitation, lost goal computations, goal impact computations, other, like, relationships, and any combination thereof.

A total lost goal computation describes the number of relevant sessions which would include a goal achievement, had the session visitors not encountered various negative user experience factors. A total lost goal computation may be executed according to the following equation:

$$TLGA = (IS * GAR_{NF}) - (IS * GAR_F) \qquad \text{Equation 1}$$

Here, the total lost goal achievements, given as "TLGA," equals the product of the number of sessions impacted by negative user experience factors, given as "IS," as determined at S320, multiplied by the rate of goal achievement for sessions not including negative user experience factors, given as "$GAR_{NF}$," as determined at S310, less the product of the number of sessions impacted by negative user experience factors, "IS," multiplied by the rate of goal achievement for sessions including negative user experience factors, given as "$GAR_F$," as determined at S310.

The total lost goal computation described above may be further applied to the determination of total lost goal achievements due to specific user experience factors by substituting the number of relevant sessions impacted by user experience factors, IS, with the number of relevant sessions impacted by the specified user experience factor, and by substituting the goal achievement rate for all relevant sessions impacted by user experience factors, $GAR_F$, with the goal achievement rate for all sessions impacted by the specified user experience factor.

Goal impact computations describe the effect of negative user experience factors on goal achievement as the percent difference between sessions including goal achievement and user experience factors and sessions including goal achievement without user experience factors. A goal impact computation may be executed according to the following equation.

$$GI\% = 100 * \frac{GAR_F - GAR_{NF}}{GAR_{NF}} \quad \text{Equation 2}$$

In Equation 2, the goal impact percentage, given as "GI %," is equal to the product of one hundred times the quotient of the rate of goal achievement for sessions including negative user experience factors, given as "$GAR_F$," as determined at S310, less the rate of goal achievement for sessions not including negative user experience factors, given as "$GAR_{NF}$," as determined at S310, divided by the rate of goal achievement for sessions not including negative user experience factors, "$GAR_{NF}$."

The goal impact computation described above may be further applied to the determination of the goal impact of specific user experience factors by substituting the goal achievement rate for all relevant sessions impacted by negative user experiences, $GAR_F$, with the goal achievement rate for all sessions impacted by the specified user experience factor.

At S340, evaluation results are returned. Evaluation results may be returned by displaying the mapping on a device, such as the user device, 120, of FIG. 1, above, by saving the ordered mapping in a storage or memory, by other, like, means, and by any combination thereof. In an embodiment, the ordered mapping may be returned as a feature of an insight report, such as the insight report, 600, of FIG. 6, below.

Figure 4:
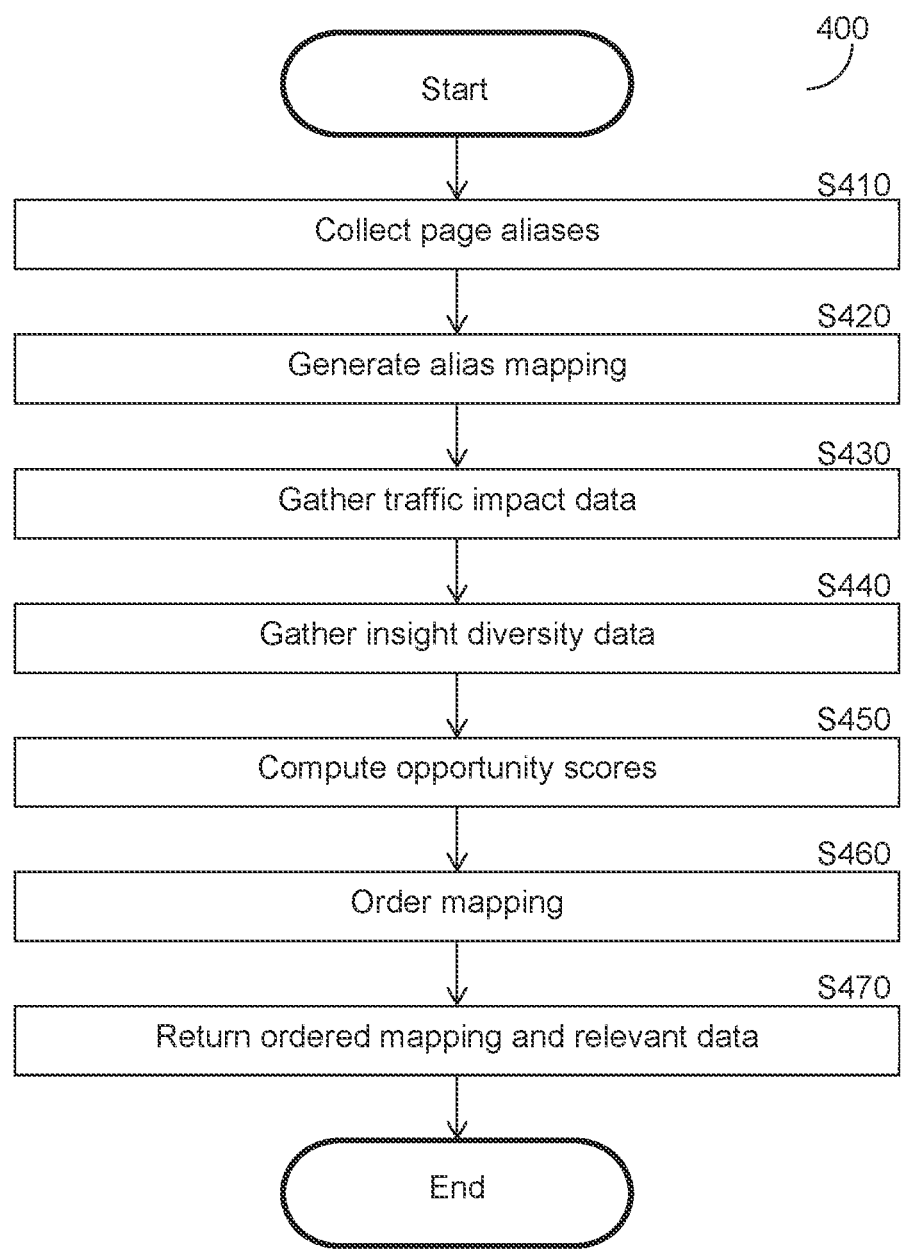
FIG. 4 is a flowchart describing a method for determining webpage user experience optimization potentials, according to an embodiment.

FIG. 4 is an example flowchart 400 describing a method for determining webpage user experience optimization potentials, according to an embodiment. The method described by the flowchart 400 may be executed by an analytic server, such as the analytic server, 130, of FIG. 1, above.

At S410, page aliases are collected. A page alias is a group of similar or equivalent webpages within the same website, group, or domain. A page alias may include different views of the same page, the same page in different languages, other, like, page variations, and any combination thereof. In an example, a page alias may include a shopping website's checkout page in English, the same page in French and Spanish, and various versions of the same pages rendered for access through various devices and browsers. Page aliases may be collected from webpage hosts, such as the web servers, 140, of FIG. 1, above.

At S420, an alias mapping is generated. An alias mapping is a list of all the page aliases collected for a given website, page, or domain. A mapping may be initially unordered, and may be subsequently ordered, including by the process described with respect to S460, below. As an example, a mapping may include, for a given shopping website, as examples and without limitation, home page aliases, product page aliases, cart page aliases, checkout page aliases, shipping page aliases, and the like. It may be understood that S420 may occur at any point after the execution of S410 and before the execution of S460, including simultaneously with any of S430, S440, or S450, without loss of generality or departure from the scope of the disclosure.

At S430, traffic impact data is gathered. Traffic impact data describes the number of webpage visitors impacted by user experience factors for a given webpage or page alias. Traffic impact data may be collected by analysis of session behaviors, such as by the methods described with respect to FIG. 2, above. Gathering of traffic impact data at S430 may include collection of interaction metrics describing aggregate session behavior. Further, the various collected interaction metrics may be separated into various insights describing recorded session behaviors for a given webpage or alias.

In an example, gathering traffic impact data may include generation of a first insight specifying that 3,000 sessions, or thirty percent of those recorded, included loading times higher than two seconds. In the same example, a second generated insight may specify that 2,000 sessions, or twenty percent of those recorded, included a "rage click" for a given button or element. The insights generated during the gathering of traffic impact data at S430 may be appended to the insights' respective aliases or webpages, tagged with the insights' respective aliases or webpages, or otherwise associated with the insights' respective aliases or webpages for subsequent analysis and review.

During the gathering of traffic impact data at S430, the insights generated may be weighted based on the contents of the individual interactions from which the insights are generated. Insights may be weighted based on factors including, without limitation, average values of recorded interactions, predefined threshold values, other, like, factors, and any combination thereof. In a first example embodiment, a weighted traffic impacted loading time score may be determined by identifying the number of sessions including high, medium, and low loading times, where session loading times are classified as "high," "medium," or "low, based on predefined thresholds. Subsequently, in the same example embodiment, the weighted traffic impact loading time score may be determined by multiplying the number of high loading time sessions by a factor of three, multiplying the number of medium loading time sessions by a factor of two, multiplying the number of low loading time sessions by one, and adding the products so determined. In a second example embodiment, a weighted traffic impacted rage click score may be determined by the same method, where the loading time metric may be substituted with a number of clicks in a predefined time period, and where the respective loading time thresholds may be substituted with the appropriate predefined click count thresholds.

At S440, insight diversity data is gathered. Insight diversity data describes the number of unique user experience factors included in a specified webpage or alias, and may be collected by analysis of session behaviors of the generated experience insights, such as by the methods described with respect to FIG. 2, above, where each collected unique user experience factor, determined by comparison of session behaviors with predetermined user experience factor behaviors, may increase the insight diversity count of a page or alias by one.

In an embodiment, S440 includes computing one or more weighted impact session scores. A weighted impact session score describes the impact of a given insight on all sessions in which the insight was observed. A weighted impact session score is computed according to various weighting schemes, as described hereinabove, and the calculation of a weighted impact session score, according to an embodiment, is achieved according to the formula given below.

$$WIS_i = \begin{cases} \sum_{j=1}^{3} j*ps_j & \text{for } \sum_{j=1}^{3} j*ps_j > 0 \\ 1 & \text{for } \sum_{j=1}^{3} j*ps_j = 0 \end{cases} \quad \text{Equation 3}$$

In the above function, the weighted impact session score for a given insight, 'i,' given as "$WIS_i$," of a given page or alias is given as a piecewise function which is evaluated conditionally based on the value of a summation series. The summation series adds the value of the products of the impact weight, given as 'j,' multiplied by the number of problematic sessions including an insight of weight 'j,' given as '$ps_j$,' for all defined impact weights. Where the value of the summation series is greater than zero, the value of the weighted impact session score for the given insight is equal to the value of the series. Where the value of the summation series is equal to zero, the value of the weighted impact session score for the given insight is equal to one.

Although three impact weight levels, 'j,' are included in the example embodiment for purposes of correspondence with the "high-medium-low" impact weighting scheme described hereinabove, it may be understood that various other weighting schemes may be applied by altering the operation of the summation series to iterate through all impact weight levels by changing the given limit value of three to equal the number of impact weight levels included in the weighting scheme.

It may be understood that steps S430 and S440 may occur in any order, including simultaneously, without loss of generality or departure from the scope of the disclosure.

At S450, opportunity scores are computed. Opportunity scores describe the potential for the reduction of negative user experience factors for a given page or alias, based on the number of negative user experience factors and the weighted impact session scores, where both are determined at S440. In an embodiment, the opportunity score of a given webpage or alias may be determined according to the following equation:

$$OS = \frac{\log\left(\prod_{i \in I} WIS_i\right)}{NUXF * \ln(2 * TAS)} \quad \text{Equation 4}$$

In the Equation 4, the opportunity score for a given page or alias, given as "OS," is given as the quotient of the logarithm of the product series of each Weighted Impact Session score for each insight, 'i,' given as "$WIS_i$," as determined hereinabove, for each insight 'i' within the set of all insights detected for the page, given as, "i∈I," divided by the number of implemented negative user experience factors, given as "NUXF," multiplied by the natural logarithm of twice the number of total alias sessions, given as "TAS."

Opportunity scores computed at S450 may be appended to the scores' respective pages or aliases, tagged with the scores' respective pages or aliases, or otherwise associated with the scores' respective pages or aliases for subsequent evaluation and analysis.

At S460, the mapping is ordered or otherwise prioritized. The mapping, generated at S420, may be ordered or prioritized based on the scores computed for each of the pages or aliases included in the mapping, where the determination of opportunity scores is described at S450. In an embodiment, the mapping may be ordered at S460 according to one or more scores including, without limitation, the opportunity scores computed at S450, the weighted impact session scores computed at S440, other, like, scores, and any combination thereof.

At S470, the ordered mapping is returned along with the relevant data. The ordered mapping, as well as the relevant data, may be returned as a rendered list, providing for visualization of the mapping, as a ".CSV" file or other non-visualized data format, by other, like, means, as well as any combination thereof. The ordered mapping may be returned by displaying the mapping on a device, such as the user device, 120, of FIG. 1, above, by saving the ordered mapping in a storage or memory, by other, like, means, and by any combination thereof. In an embodiment, the ordered mapping may be returned as a feature of an insight report, such as the insight report, 600, of FIG. 6, below.

Figure 5:
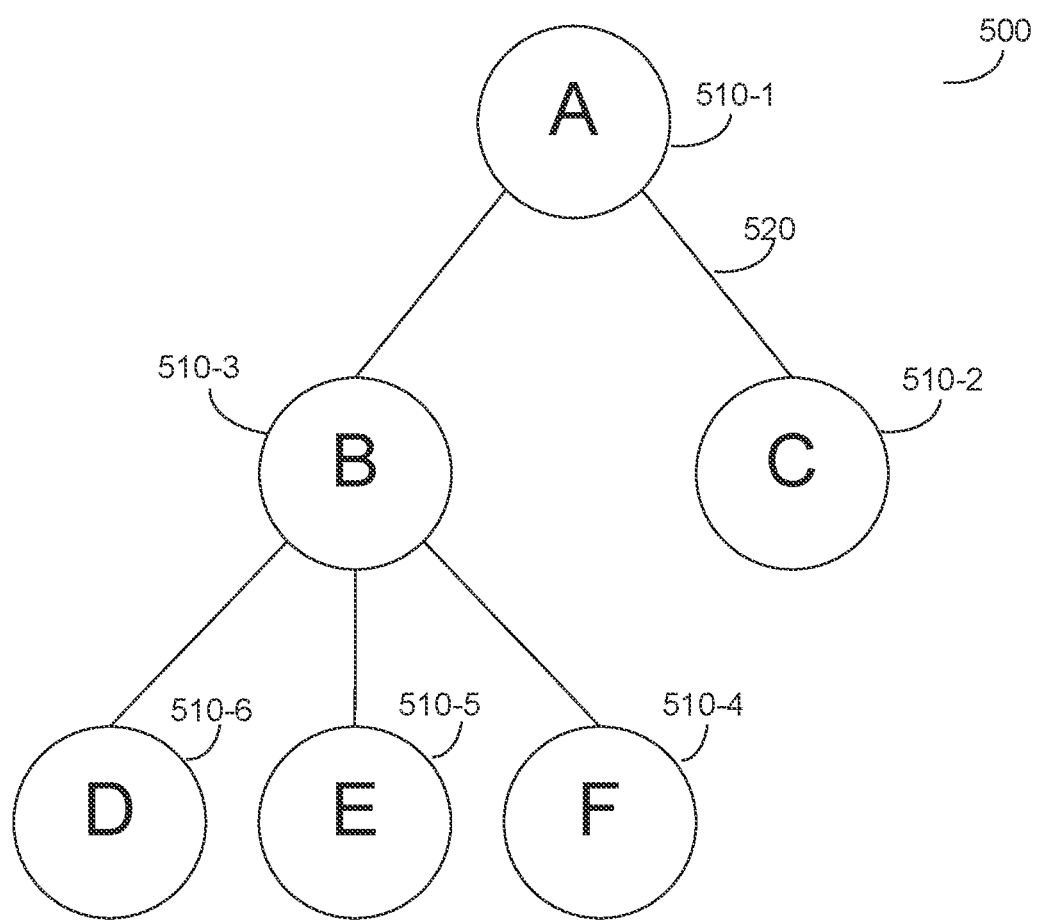
FIG. 5 is a diagram depicting an unlabeled document object model (DOM) tree, according to an embodiment.

FIG. 5 is an example diagram depicting an unlabeled document object model (DOM) tree 500, according to an embodiment. The unlabeled DOM tree 500 provides a visual representation of the hierarchical structure of a webpage's HTML code, with content zones or elements represented as nodes, 510-1 through 510-6 (hereinafter, "nodes" 510). In the example unlabeled DOM tree 500, related nodes 510 are joined by "links" 520, representing the relationships between two nodes 510. In the example unlabeled DOM tree 500, links 520 are established between nodes 510-1 and 510-2 and between nodes 510-3 and 510-1.

In the example unlabeled DOM tree 500, nodes 510-3 and 510-2 are disposed on a second tier below the first tier occupied by node 510-1, reflecting a structure wherein the content element or zone represented by node 510-1 includes the content elements or zones represented by nodes 510-2 and 510-3. Although only the link 520 between nodes 510-1 and 510-2 is labeled, this label is provided for simplicity, and other, like, links 520 may be likewise labeled without loss of generality or departure from the scope of the disclosure.

Figure 6:
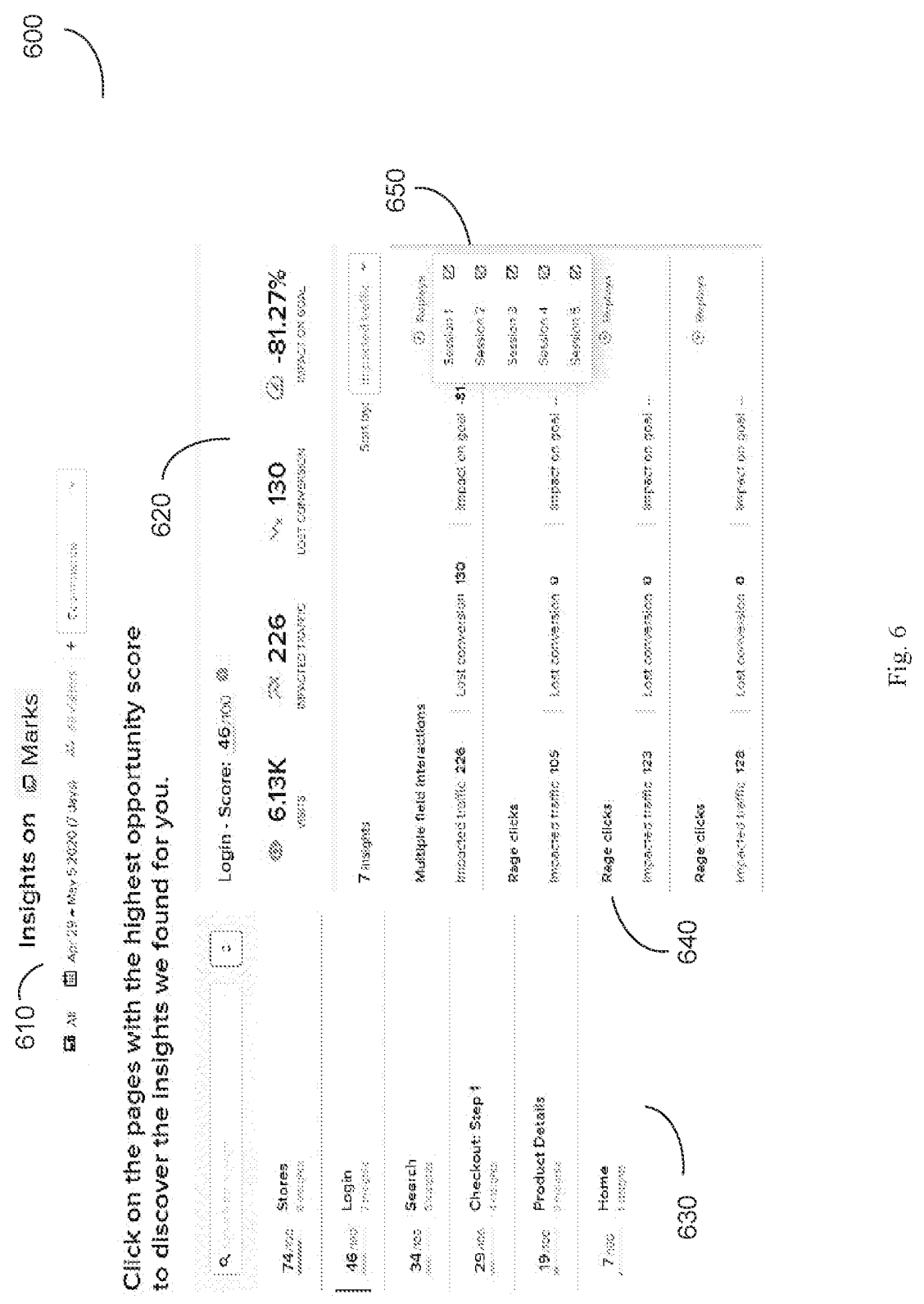

FIG. 6 is an example user experience insight report 600 generated according to an embodiment. The insight report 600 includes data management and analysis tools and visualizations, providing high-level support for administrators, supervisors, and other users accessing aggregated insight data. The insight report 600 includes a selection tool 610, a data aggregation panel 620, a page-level score panel 630, an insight overview panel 640, and a session replay tool 650. The insight report may be generated by an analytic server, such as the analytic server, 130, of FIG. 1, above, and may be provided to administrators, supervisors, and other users through devices such as, as examples and without limitation, the user devices 120, of FIG. 1, above. The insight report 600 may include none, some, or all of the features described above, other, like, features, and any combination thereof.

The selection tool 610 provides a control function for data review, providing for selection of various attributes to customize the data presentations included in the insight report 600. In an embodiment, the selection tool 610 may provide for filtering of data presentations based on features including, without limitation, selected device types, selected time or date ranges, selected visitors or visitor groups, selected mappings, other, like, features, and any combination thereof.

The data aggregation panel 620 provides a page-level overview of various statistics collected during session monitoring. The data aggregation panel 620 may be configured to display statistics relevant to a page or page alias specified or selected in the page-level score panel 630. Further, in an embodiment, the data aggregation panel may be configured to display statistics relevant to all pages monitored. The data aggregation panel 620 may include statistics relevant to, as examples and without limitation, opportunity scores, page visits, impacted page visits, net goal yield, such as a number of sales abandoned on a shopping website, a goal yield impact score, other, like, statistics, and any combination thereof.

The page-level score panel 630 provides a listing of various pages and page aliases, as well as the opportunity scores associated with pages or page aliases. In an embodiment, opportunity scores may be determined as described with respect to FIG. 4, above. Pages and page aliases included in the page-level score panel may be ordered according to the various respective opportunity scores, or based on other, like, metrics. The page-level score panel 630 may include a search bar, providing for rapid location and selection of particular pages or page aliases. The page-level score panel 630 may be configured such that selection of a particular page or page alias reconfigures the data aggregation panel 620, insight overview panel 640, and replay tool 650 to include information relevant to the selected page or page alias.

The insight overview panel 640 provides an insight overview for a selected page or page alias. The insight overview panel 640 may include various user experience factor insights collected for the specified page or page aliases, as well as various data metrics associated with the various user experience factor insights. Data metrics included in the insight overview panel may include measures of, for each listed user experience factor insight, as examples and without limitation, impacted traffic counts, net goal yields, goal yield impact scores, other, like, metrics, and any combination thereof. The insight overview panel 640 may include a metric sort feature, providing for the re-ordering of the various user experience factor insights included in the insight overview panel 640 based on the various metrics associated with each user experience factor insight. The user experience factor insights included in the insight overview panel may further include session replay tool 650 launchers, which may be configured to provide access to the session replay tool 650 for the various sessions included in each user experience factor insight.

The session replay tool 650 provides for the selection and review of individual sessions. Individual sessions may be selected from a list of sessions relevant to the selected user experience factor insight for the selected page or page alias, where such a list may be included in the session replay tool 650. Where a session is selected in the session replay tool 650, the selected session may be provided to an administrator, supervisor, or other user as a video output displayed on a user device, such as the user device, 120, of FIG. 1, above, providing for replay and review of sessions in which a specific user experience factor is recorded.

Figure 7:
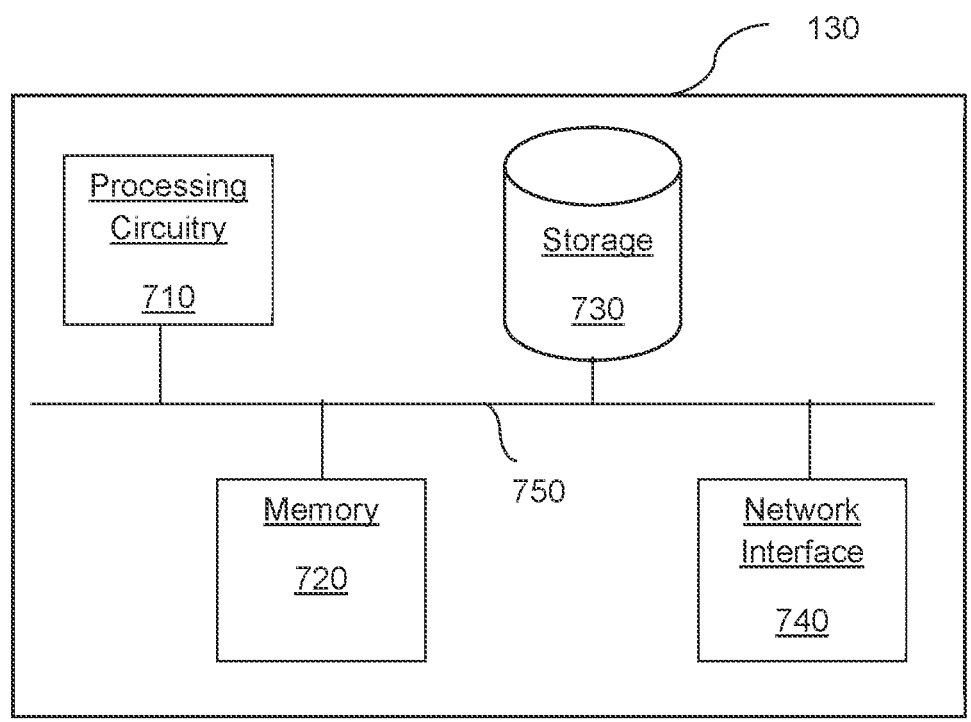
FIG. 7 is a schematic diagram of an analytic server, according to an embodiment.

FIG. 7 is an example schematic diagram of an analytic server 130, according to an embodiment. The analytic server 130 includes a processing circuitry 710 coupled to a memory 720, a storage 730, and a network interface 740. In an embodiment, the components of the server 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 740 allows the analytic server 130 to communicate with the various components, devices, and systems described herein for identifying and scoring in-page behavior, and for other, related purposes.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for analyzing in-page behavior of a plurality of users interacting with a website, the method comprising:
   analyzing a plurality of recorded sessions of the plurality of users interacting with at least one webpage of the website displayed by a plurality of devices, wherein each of the recorded sessions is a time-ordered collection of substantially uninterrupted action events of one of the plurality of users interacting with the at least one webpage of the website displayed by one of the plurality of devices;
   determining a percentage of users that encountered user experience factors in the plurality of recorded sessions, wherein each user experience factor describes at least one event that hindered the user from reaching an objective in the at least one webpage;
   determining user experience-goal relationships based on the encountered user experience factors, each user experience-goal relationship describing an impact of at least one negative user experience factor on goal achievement; and
   causing presentation on a display of an insight report based on the determined user experience-goal relationships.

2. The method as recited in claim 1, wherein analyzing the plurality of recorded sessions comprises:
   identifying at least one recorded session from the plurality of recorded sessions that include an achievement of at least one goal; and
   determining a total number or recorded sessions that included the achievement of the at least one goal.

3. The method as recited in claim 1, wherein determining the percentage of users that encountered user experience factors further comprises:
   identifying a number of recorded sessions where users encountered a negative user experience; and
   determining the percentage of users based a total number of recorded sessions in the plurality of recorded sessions and the number of recorded sessions where users encountered a negative user experience.

4. The method as recited in claim 1, wherein determining the percentage of users that encountered user experience factors further comprises:
   determining a percentage of users reaching one or more predefined goals while interacting with the at least one webpage.

5. The method as recited in claim 4, wherein determining the percentage of users reaching one or more predefined goals comprises;
   identifying a number of recorded sessions that included a goal-completion event without duplicate users; and
   calculating the percentage of users reaching one or more predefined goals based on the number of recorded sessions that included a goal-completion event without duplicate users and a total number of non-duplicate sessions.

6. The method as recited in claim 1, wherein the user experience-goal relationships includes a total lost goal computation, the method further comprising:
   calculating the total lost goal computation as a number of sessions impacted by negative user experience factors times a rate of goal achievement for sessions not including negative user experience factors minus rate of goal achievement for sessions including negative user experience factors.

7. The method as recited in claim 1, wherein the user experience-goal relationships includes a goal impact computation, the method further comprising:
   calculating the goal impact computation based on a ratio of a difference between a rate of goal achievement for sessions including negative user experience factors and a rate of goal achievement for sessions not including negative user experience factors divided by the rate of goal achievement for sessions not including negative user experience factors.

8. The method as recited in claim 1, wherein each recorded session in the plurality of recorded sessions includes at least one webpage with at least one quantifiable goal, wherein the at least one quantifiable goal is performing a specific action within the website to accomplish an objective.

9. The method as recited in claim 1, wherein each of the user experience factors describes a behavior of a user within the at least one webpage visited during a session.

10. The method as recited in claim 1, further comprising:
    computing an opportunity score for a webpage, wherein an opportunity score is a potential for a reduction of a negative user experience factor for the webpage.

11. A system comprising:
    a memory comprising instructions; and
    one or more computer processors, wherein the instructions, when executed by the one or more computer processors, cause the system to perform operations for analyzing in-page behavior of a plurality of users interacting with a web site, the operations comprising:
  analyzing a plurality of recorded sessions of the plurality of users interacting with at least one webpage of the website displayed by a plurality of devices, wherein each of the recorded sessions is a time-ordered collection of substantially uninterrupted action events of one of the plurality of users interacting with the at least one webpage of the website displayed by one of the plurality of devices;
  determining a percentage of users that encountered user experience factors in the plurality of recorded sessions, wherein each user experience factor describes at least one event that hindered the user from reaching an objective in the at least one webpage;
  determining user experience-goal relationships based on the encountered user experience factors, each user experience-goal relationship describing an impact of at least one negative user experience factor on goal achievement; and
  causing presentation on a display of an insight report based on the determined user experience-goal relationships.

12. The system as recited in claim 11, wherein analyzing the plurality of recorded sessions comprises:
  identifying at least one recorded session from the plurality of recorded sessions that include an achievement of at least one goal; and
  determining a total number or recorded sessions that included the achievement of the at least one goal.

13. The system as recited in claim 11, wherein determining the percentage of users that encountered user experience factors further comprises:
  identifying a number of recorded sessions where users encountered a negative user experience; and
  determining the percentage of users based a total number of recorded sessions in the plurality of recorded sessions and the number of recorded sessions where users encountered a negative user experience.

14. The system as recited in claim 11, wherein determining the percentage of users that encountered user experience factors further comprises:
  determining a percentage of users reaching one or more predefined goals while interacting with the at least one webpage.

15. The system as recited in claim 14, wherein determining the percentage of users reaching one or more predefined goals comprises;
  identifying a number of recorded sessions that included a goal-completion event without duplicate users; and
  calculating the percentage of users reaching one or more predefined goals based on the number of recorded sessions that included a goal-completion event without duplicate users and a total number of non-duplicate sessions.

16. A tangible machine-readable storage medium including instructions that, when executed by a machine, cause the machine to perform operations for analyzing in-page behavior of a plurality of users interacting with a website, the operations comprising:
  analyzing a plurality of recorded sessions of the plurality of users interacting with at least one webpage of the website displayed by a plurality of devices, wherein each of the recorded sessions is a time-ordered collection of substantially uninterrupted action events of one of the plurality of users interacting with the at least one webpage of the website displayed by one of the plurality of devices;
  determining a percentage of users that encountered user experience factors in the plurality of recorded sessions, wherein each user experience factor describes at least one event that hindered the user from reaching an objective in the at least one webpage;
  determining user experience-goal relationships based on the encountered user experience factors, each user experience-goal relationship describing an impact of at least one negative user experience factor on goal achievement; and
  causing presentation on a display of an insight report based on the determined user experience-goal relationships.

17. The tangible machine-readable storage medium as recited in claim 16, wherein analyzing the plurality of recorded sessions comprises:
  identifying at least one recorded session from the plurality of recorded sessions that include an achievement of at least one goal; and
  determining a total number or recorded sessions that included the achievement of the at least one goal.

18. The tangible machine-readable storage medium as recited in claim 16, wherein determining the percentage of users that encountered user experience factors further comprises:
  identifying a number of recorded sessions where users encountered a negative user experience; and
  determining the percentage of users based a total number of recorded sessions in the plurality of recorded sessions and the number of recorded sessions where users encountered a negative user experience.

19. The tangible machine-readable storage medium as recited in claim 16, wherein determining the percentage of users that encountered user experience factors further comprises:
  determining a percentage of users reaching one or more predefined goals while interacting with the at least one webpage.

20. The tangible machine-readable storage medium as recited in claim 19, wherein determining the percentage of users reaching one or more predefined goals comprises;
  identifying a number of recorded sessions that included a goal-completion event without duplicate users; and
  calculating the percentage of users reaching one or more predefined goals based on the number of recorded sessions that included a goal-completion event without duplicate users and a total number of non-duplicate sessions.

* * * * *

UNITED STATES PATENT AND TRADEMARK OFFICE
CERTIFICATE OF CORRECTION

| | |
|---|---|
| PATENT NO. | : 11,822,614 B2 |
| APPLICATION NO. | : 17/860305 |
| DATED | : November 21, 2023 |
| INVENTOR(S) | : Wang et al. |

It is certified that error appears in the above-identified patent and that said Letters Patent is hereby corrected as shown below:

In the Specification

In Column 3, Lines 40-41, delete "140-N(hereinafter" and insert --140-N (hereinafter-- therefor In Column 9, Lines 27-28, delete "equation." and insert --equation:-- therefor In Column 12, Line 3, delete ""i∈1,"" and insert --"*i∈1*,"-- therefor In the Claims In Column 16, Line 24, in Claim 5, delete "comprises;" and insert --comprises:-- therefor In Column 17, Line 2, in Claim 11, delete "web site," and insert --website,-- therefor In Column 17, Line 48, in Claim 15, delete "comprises;" and insert --comprises:-- therefor In Column 18, Line 51, in Claim 20, delete "comprises;" and insert --comprises:-- therefor Signed and Sealed this
Fourth Day of March, 2025

Coke Morgan Stewart
*Acting Director of the United States Patent and Trademark Office*